US009965802B2

(12) United States Patent
Powell et al.

(10) Patent No.: US 9,965,802 B2
(45) Date of Patent: May 8, 2018

(54) METHOD FOR BIDDING BATTERY STORAGE INTO HOUR-AHEAD ENERGY MARKETS

(71) Applicants: Warren B. Powell, Princeton, NJ (US); Daniel R. Jiang, Princeton, NJ (US)

(72) Inventors: Warren B. Powell, Princeton, NJ (US); Daniel R. Jiang, Princeton, NJ (US)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 496 days.

(21) Appl. No.: 14/633,974

(22) Filed: Feb. 27, 2015

(65) Prior Publication Data

US 2015/0242946 A1 Aug. 27, 2015

Related U.S. Application Data

(60) Provisional application No. 61/945,273, filed on Feb. 27, 2014.

(51) Int. Cl.

| | |
|---|---|
| ***G06Q 30/00*** | (2012.01) |
| ***G06Q 30/08*** | (2012.01) |
| ***G06F 17/30*** | (2006.01) |

(52) U.S. Cl.

CPC ....... *G06Q 30/08* (2013.01); *G06F 17/30952* (2013.01)

(58) Field of Classification Search

None

See application file for complete search history.

(56) References Cited

U.S. PATENT DOCUMENTS

| | | | | |
|---|---|---|---|---|
| 6,021,402 A * | 2/2000 | Takriti | G06Q 10/06 | 700/28 |
| 2011/0231320 A1* | 9/2011 | Irving | G06Q 30/00 | 705/80 |
| 2013/0245847 A1* | 9/2013 | Steven | G06Q 50/06 | 700/291 |

(Continued)

OTHER PUBLICATIONS

Ayer, et al. "An Empirical Distribution Function for Sampling with Incomplete Information", The Annals of Mathematical Statistics, vol. 26, No. 4, pp. 641-647 (Dec. 1955).

(Continued)

*Primary Examiner* — Naeem U Haq

*Assistant Examiner* — Norman Sutch, Jr.

(74) *Attorney, Agent, or Firm* — Meagher Emanuel Laks Goldberg & Liao, LLP.

(57) ABSTRACT

A method for generating bids for a look-ahead, e.g. hour-ahead, energy market is disclosed. The method includes providing a processor configured to generate a lookup table approximating a value function having four dimensions including: state of the storage system, price of electricity, prior low bid and prior high bid. The processor is configured to observe an initial numeric value for a first set of dimensions and exploiting monotonicity to update a first region of the lookup table. The processor is configured to iteratively observe subsequent numeric values for a next set of dimensions and update subsequent regions of the lookup table while exploiting monotonicity to generate the lookup table. The value function is configured with numeric values for all possible sets of dimensions, the numeric values being usable to compute optimal bids.

20 Claims, 8 Drawing Sheets

(56) References Cited

U.S. PATENT DOCUMENTS

2014/0310059 A1* 10/2014 Ellis ....................... G06Q 10/04
705/7.31
2016/0055507 A1* 2/2016 Patil .................. G06Q 30/0206
705/7.31

OTHER PUBLICATIONS

Binsbergen, et al. "Solving Dynamic Portfolio Choice Problems by Recursing on Optimized Portfolio Weights or on the Value Function?" Computational Economics, vol. 29, pp. 355-367, (2007).
Brunk "Maximum Likelihood Estimates of Monotone Parameters", The Annuls of Mathematical Statistics, (1954).
Dette, et al. "A Simple Nonparametric Estimator of a Strictly Monotone Regression Function" Bernoulli, vol. 12, pp. 469-490 (2006).
Mammen "Estimating a Smooth Monotone Regression Function", The Annals of Statistics, vol. 19, No. 2, pp. 724-740 (1991).
McCall "Economics of Information and Job Search" The Quarterly Journal of Economics, vol. 84, No. 1, pp. 113-126, (Feb. 1970).
Mukerjee "Monotone Nonparametric Regression" The Annals of Statistics, vol. 16, No. 2, pp. 741-750, (1998).
Muller "How Does the Value Function of a Markov Decision Process Depend on the Transition Probabilities?" Mathematics of Operations Research, vol. 22, No. 4, (Nov. 1997).
Nascimento, et al. "An Optimal Approximate Dynamic Programming Algorithm for the Lagged Asset Acquisition Problem", Mathematics of Operations Research, vol. 34, No. 1, pp. 210-237 (Feb. 2009).
Nascimento, et al. "Dynamic Programming Models and Algorithms for the Mutual Fund Cash Balance Problem" Management Science, vol. 56, No. 5, pp. 801-815, (May 2010).
Papadaki, et al. "Exploiting Structure in Adaptive Dynamic Programming Algorithms for a Stochastic Batch Service Problem" European Journal of Operational Research, vol. 142, pp. 108-127, (2002).
Papadaki, et al. "A Discrete On-Line Monotone Estimation Algorithm" London School of Economics and Political Science, Working Paper 03.73 (2003).
Papadaki, et al. "An Adaptive Dynamic Programming Algorithm for a Stochastic Multiproduct Batch Dispatch Problem" Naval Research Logistics, vol. 50, pp. 742-769, (2003).
Powell, et al. "Learning Algorithms for Separable Approximations of Discrete Stochastic Optimization Problems" Mathematics of Operations Research, vol. 29, No. 4, pp. 814-836, (Nov. 2004).
Ramsay, et al. "Estimating Smooth Monotone Functions" Journal of the Royal Statistical Society, vol. 60, Part 2, pp. 365-375, (1998).
Smith, et al. Structural Properties of Stochastic Dynamic Programs Operations Research, vol. 50, No. 5, pp. 796-809, (2002).
Topaluglu, et al. "An Algorithm for Approximating Piecewise Linear Concave Functions from Sample Gradients" Operations Research Letters, (Jul. 2002).

* cited by examiner

130

| State of the storage system | Price of electricity | Low Bid -1 | High Bid -1 | Numeric Value |
|---|---|---|---|---|
| 0 | 0 | 0 | 0 | x |
| 0 | 0 | 0 | 1 | x |
| 0 | 0 | 0 | 2 | x |

•

•

•

Figure 6

METHOD FOR BIDDING BATTERY STORAGE INTO HOUR-AHEAD ENERGY MARKETS

CROSS-REFERENCE TO PRIOR FILED APPLICATIONS

This application claims the benefit of U.S. Provisional Application No. 61/945,273, filed Feb. 27, 2014, which is incorporated herein in its entirety.

STATEMENT REGARDING FEDERALLY SPONSORED RESEARCH OR DEVELOPMENT

This invention was made with government support under Grant No. ECCS-1127975 awarded by the National Science Foundation. The government has certain rights in this invention.

TECHNICAL FIELD

The present disclosure generally relates to the field of energy storage and in more particular to systems and methods for controlling networked, grid-level energy storage devices.

BACKGROUND OF THE INVENTION

Increasing interest in renewables over the past two decades has led to active research and development of storage technologies. Energy storage has received significant attention as a way to increase the efficiency of the electrical grid by smoothing the flow of power from renewables such as wind and solar. In particular, storage has been proposed as a strategy for reducing curtailment, time-shifting, spinning reserve, peak shaving and electricity price arbitrage.

However, the intermittent and uncertain nature of wind and solar energy, which arrive at rates that vary stochastically, presents a fundamental challenge to the integration of storage into the electricity grid as penetration levels rise over the next several years. It is important that storage devices be managed to effectively to minimize congestion and to maximize revenues generated from energy shifting in the face of time-dependent and highly stochastic prices. For these reasons, practical and adaptive methods for optimal control of such power systems are critical for the deployment.

BRIEF SUMMARY OF THE INVENTION

A method for generating bids for a look-ahead, e.g. hour-ahead, energy market is disclosed. The method includes providing a processor configured to generate a lookup table approximating a value function having four dimensions including: state of the storage system, price of electricity, prior low bid and prior high bid. The processor is configured to observe an initial numeric value for a first set of dimensions and exploiting monotonicity to update a first region of the lookup table. The processor is configured to iteratively observe subsequent numeric values for a next set of dimensions and update subsequent regions of the lookup table while exploiting monotonicity to generate the lookup table. The value function is configured with numeric values for all possible sets of dimensions, the numeric values being usable to compute optimal bids.

The look-ahead energy market may be an hour-ahead energy market. A specific numeric value in the lookup table may be located based on a known set of dimensions and optimal bids may be generated based on the specific numeric value. A second processor may be provided, the second processor being configured to locate the specific numeric value in the lookup table and generate the optimal bids based on the specific numeric value. The optimal bids may include a low bid for a future time period and a high bid for the future time period. The lookup table may be updated on a periodic basis. The lookup table may be updated on a daily basis.

A system for generating bids for a look-ahead energy market is also disclosed. The system includes a processor configured to generate a lookup table approximating a value function having four dimensions including: state of the storage system, price of electricity, prior low bid and prior high bid. The processor is configured to observe an initial numeric value for a first set of dimensions and exploiting monotonicity to update a first region of the lookup table. The processor is configured to iteratively observe subsequent numeric values for a next set of dimensions and update subsequent regions of the lookup table while exploiting monotonicity to generate the lookup table. The value function is configured with numeric values for all possible sets of dimensions, the numeric values being usable to compute optimal bids.

The look-ahead energy market may be an hour-ahead energy market. The processor may be configured to locate a specific numeric value in the lookup table based on a known set of dimensions and generate the optimal bids based on the specific numeric value. A second processor may be configured to locate a specific numeric value in the lookup table based on a known set of dimensions and generate the optimal bids based on the specific numeric value. The optimal bids may include a low bid for a future time period and a high bid for the future time period. The lookup table may be updated on a periodic basis. The lookup table may be updated on a daily basis.

A non-transitory computer-readable medium is also disclosed, the non-transitory computer-readable medium having stored thereon a computer program for execution by a processor configured to perform a method for generating bids for a look-ahead energy market. The method includes providing a processor configured to generate a lookup table approximating a value function having four dimensions including: state of the storage system, price of electricity, prior low bid and prior high bid. The processor is configured to observe an initial numeric value for a first set of dimensions and exploiting monotonicity to update a first region of the lookup table. The processor is configured to iteratively observe subsequent numeric values for a next set of dimensions and update subsequent regions of the lookup table while exploiting monotonicity to generate the lookup table. The value function is configured with numeric values for all possible sets of dimensions, the numeric values being usable to compute optimal bids.

The look-ahead energy market may be an hour-ahead energy market. A specific numeric value in the lookup table may be located based on a known set of dimensions and optimal bids may be generated based on the specific numeric value. A second processor may be provided, the second processor being configured to locate the specific numeric value in the lookup table and generate the optimal bids based on the specific numeric value. The optimal bids may include a low bid for a future time period and a high bid for the future time period. The lookup table may be updated on a periodic basis. The lookup table may be updated on a daily basis.

BRIEF DESCRIPTION OF THE DRAWINGS

FIG. 6 is a diagram of a portion of a lookup table.

DETAILED DESCRIPTION

Figure 1:
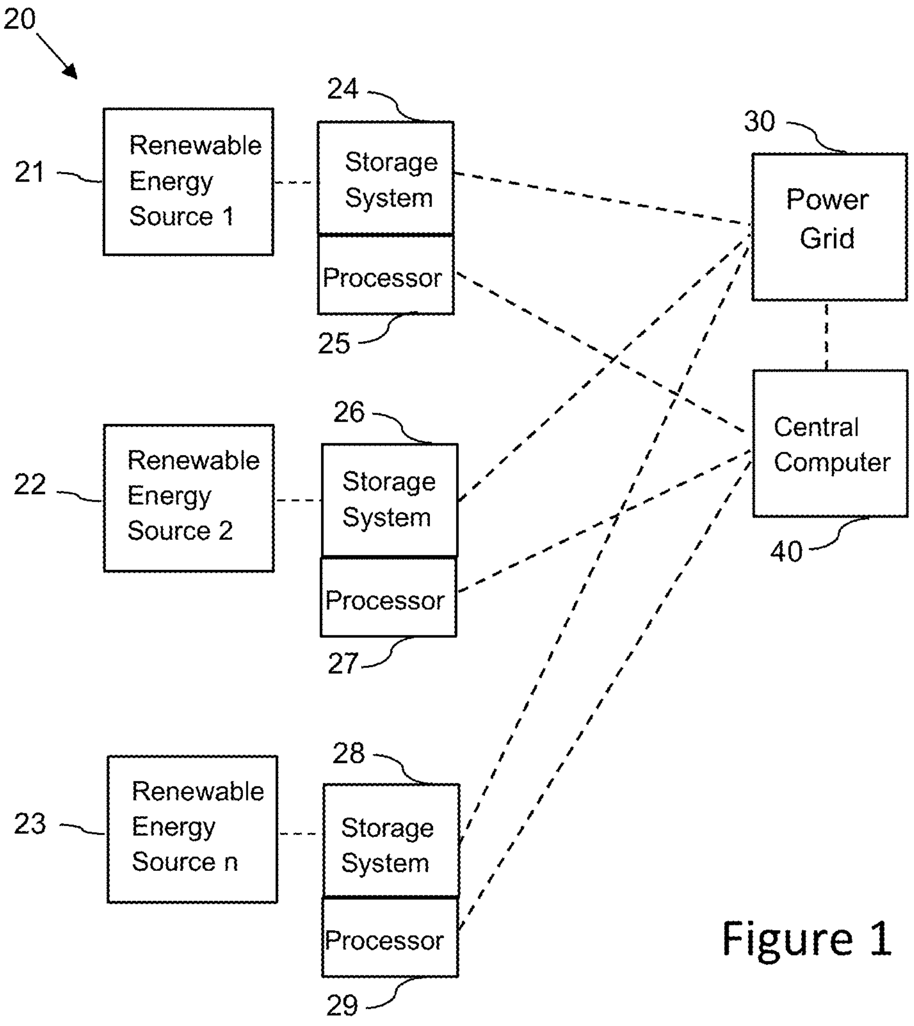
FIG. 1 is a block diagram of a grid level power control system including a plurality of renewable energy sources coupled to a power grid and a central computer.

The approach disclosed herein is described in the follow paper: Daniel R. Jiang, W. B. Powell, *Optimal Hour-Ahead Bidding in the Real-Time Electricity Market with Battery Storage using Approximate Dynamic Programming* attached in Provisional Application No. 61/945,273 both of which are incorporated herein in their entirety. Relevant disclosure is also contained in the following paper: D. F. Salas, W. B. Powell, *Benchmarking a Scalable Approximation Dynamic Programming Algorithm for Stochastic Control of Multidimensional Energy Storage Problems*, attached in Provisional Application No. 61/886,435 and U.S. patent application Ser. No. 14/506,246, filed Oct. 3, 2014, all of which are incorporated herein in their entirety.

There is growing interest in the use of grid-level storage to smooth variations in supply that are likely to arise with increased use of wind and solar energy. Battery arbitrage, the process of buying, storing, and selling electricity to exploit variations in electricity spot prices, is becoming an important way of paying for expensive investments into grid level storage. Independent System Operators (ISOs) such as the NYISO (New York Independent System Operator) require that battery storage operators place bids into an hour-ahead market (although settlements may occur in increments as small as 5 minutes, which is considered near "real-time"). The operator has to place these bids without knowing the energy level in the battery at the beginning of the hour, while simultaneously accounting for the value of left-over energy at the end of the hour. The problem is formulated using the dynamic programming framework. Disclosed herein is a convergent approximate dynamic programming (ADP) algorithm that exploits monotonicity of the value functions to find a profitable bidding policy.

The disclosed approach includes a system and method for bidding battery storage and a new approach for designing a profit-maximizing policy that controls the placement of hour-ahead bids in a real-time electricity market, while considering battery storage. The approach has application for battery arbitrage, as well as for any other industrial or market problem involving monotone value functions, typically involving the storage of assets.

Bidding into the electricity market can be a complicated process, mainly due to the requirement of balancing supply and demand at each point in the grid. To solve this issue, the ISOs and the Regional Transmission Organizations (RTOs) generally use multi-settlement markets: several tiers of markets covering planning horizons that range from day-ahead to real-time. The idea is that the markets further away from the operating time settle the majority of the generation needed to handle the predicted load, while the markets closer to the operating time correct for the small, yet unpredictable deviations that may be caused by issues like weather, transmission problems, and generation outages. Settlements in these real-time markets are based on a set of intra-hour prices, typically computed at 5, 10, or 15 minute intervals, depending on the specific market in question. A settlement refers to the financial transaction after a generator clears the market, which refers to being selected to either buy or sell energy from the market. If a generator does not clear the market, it remains idle and no settlement occurs. We refer to this situation as being out of the market.

Many ISO's and RTO's, such as the Pennsylvania-New Jersey-Maryland Interconnection (PJM), deal with the balancing market primarily through the day-ahead market. PJM's balancing market clears every 5 minutes (considered to be near-real-time), but the bids are all placed the previous day. In certain markets, however, it is not only possible to settle in real-time, but market participants can also submit bids each hour, for an hour in the future. Thus, a bid (consisting of buy and sell prices) can be made at 1 pm that will govern the battery between 2 pm and 3 pm. The process of both bidding and settling in real-time is a characteristic of the New York Independent System Operator (NYISO) real-time market. Other prominent examples of markets that include a real-time bidding aspect include California ISO (CAISO) and Midcontinent ISO (MISO).

A desirable goal is to pair battery storage with hour-ahead bidding in the real-time market for profit maximization, a strategy sometimes referred to as battery arbitrage. It is unlikely that profits from battery arbitrage alone can be sustainable for a company; however, if performed optimally, it can be an important part of a range of profit generating activities (one such example is the frequency regulation market). Traditionally, a problem such as the bidding problem can be solved optimally using classical algorithms, i.e., backward dynamic programming or exact value iteration. However, for a realistic instance of the bidding problem, the state space becomes far too large for such a method to be computationally practical.

The disclosed approach utilizes a convergent approximate dynamic programming (ADP) algorithm that exploits monotonicity of the value functions to find a profitable bidding policy in a computationally practical fashion.

FIG. 1 is a block diagram of a power control system 20 including a plurality of renewable energy sources 21-23 coupled to a power grid 30 and a central computer 40. It should be understood that the central computer 40 includes a processor, memory and operating system as needed to implement the disclosed approach. The renewable energy sources 21-23 may include a variety of energy sources configured to generate electrical energy from sunlight, wind or other renewable sources. Examples of such devices include solar panels and wind turbines as are well known in the art. In this example, each renewable energy source 21-23 is coupled to a storage system 24, 26, 28 respectively. A typical storage system includes one or more batteries or other electrical energy storage devices and is coupled to the power grid 30 as is well known in the art. It should be understood that other configurations are possible without departing from the scope of this disclosure. For example, multiple renewable energy sources may be coupled to a single storage system. Each storage system also has a storage system processor 25, 27, 29 configured to transmit current charge state information to the central computer. The storage system processor 25, 27, 29 may be configured to carry out some of the processing required to carry out the determination of suitable bids. The storage system processor 25, 27, 29 may also be configured to determine whether to charge or discharge the storage system and/or may be configure to receive charge/discharge instructions from the central computer.

The goal is to optimally control the storage system such as a battery e.g., a 1 MW battery. In practice, a company may operate a fleet of such batteries. Market rules state that we must bid in integer increments, meaning the possible actions at each settlement are to charge, discharge (both at a rate of 1 MW), or do nothing. Hence, our precise problem is to optimize the placement of two hour-ahead bids, a “positive” bid (for a quantity of +1 MW) and a “negative” bid (for a quantity of −1 MW) that correspond to selling (generation) and buying (negative generation), respectively, over a period of time such that purchased energy can be stored in the finite capacity battery. The stored energy can be carried over from hour to hour and sold at a future time. The objective is to maximize the expected profits over a given time horizon. In this specific situation where we only bid for two quantities, we sell to the market when the spot price of electricity rises above our sell bid or we buy from the market when it falls below our buy bid. There is an undersupply penalty when we are unable to deliver to the market (i.e., when the battery is empty) that is proportional to the price. Further, we assume no price impact (i.e., our bids do not affect the spot prices of electricity).

In general, the central computer 40 stores several parameters that are used to determine an appropriate bid. In general, the bid is represented by two parameters: a low bid and a high bid. If the price electricity is below the low bid the system will store energy, if the price of electricity is above the high bid, the system will sell energy. It should also be understood that each of the various system parameters have an associate time frame, e.g., current time, an hour ago or −1 hr and an hour in the future or +1 hr.

In determining the appropriate bid, the system starts with system parameters that are known at the current time. These system parameters include: the current state of the storage system (e.g., energy level in the storage system), the current price of electricity, the low bid and the high bid decided an hour ago. Thus the appropriate state is a variable with four dimensions. It is possible to determine an optimal bid if we can compute the value of the state that such a decision puts us into. However, computing the value of an arbitrary function of four variables is computationally difficult. The field of approximate dynamic programming (ADP) (also known as reinforcement learning (RL)) emerged specifically to address this problem, but extensive research applying existing methods proved unsuccessful. However, we identified a new process that overcomes the limitations of existing methods for approximating functions. These include brute-force lookup tables (computing a different value for every state, which are computationally expensive for functions with more than three dimensions) to a range of statistical methods from machine learning (linear regression, nonparametric methods, support vector machines).

We have developed a new process that combines lookup tables while exploiting the monotonicity of the value function, which captures the behavior that the value becomes larger as each variable in the state variable becomes larger. This new process is called “Monotone-ADP.”

In order to deal with the complexity of computing a function that gives the value of being in a four-dimensional state, the new Monotone-ADP process is used. The Monotone-ADP process is implemented to solve for the optimal value functions based on the monotonicity properties of the system parameters. The disclosed Monotone-ADP process has two basic parts, estimating the value function and then using the value function to generate bids. Estimating the value function is computationally complex and can be carried out on a periodic basis, e.g., once per day. For this reason, value function estimation may be implemented on a central computer. Once estimation of the value function is complete, a look-up table is generated and use of the value function allows near-optimal bids to be computed extremely quickly. Thus, use of the value function may be implemented on the central computer or other lower power computing devices including a storage system processor or other processing device that may be integrated onto other devices including a household thermostat.

Figure 2A:
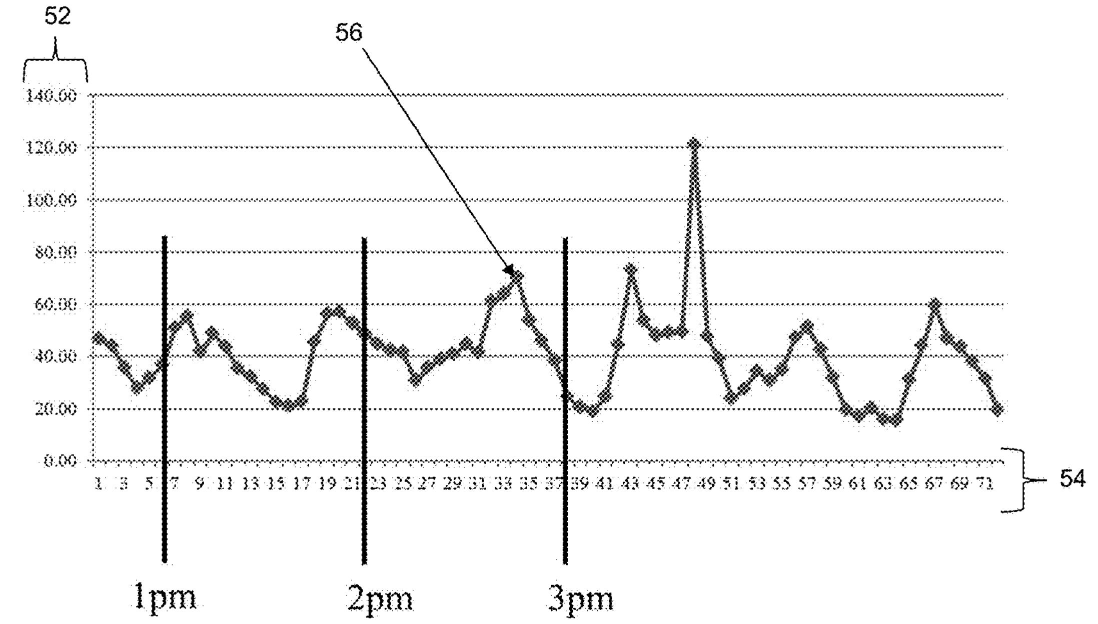
FIGS. 2*a*-2*c* are graphs generally illustrating the bidding process.
Figure 2B:
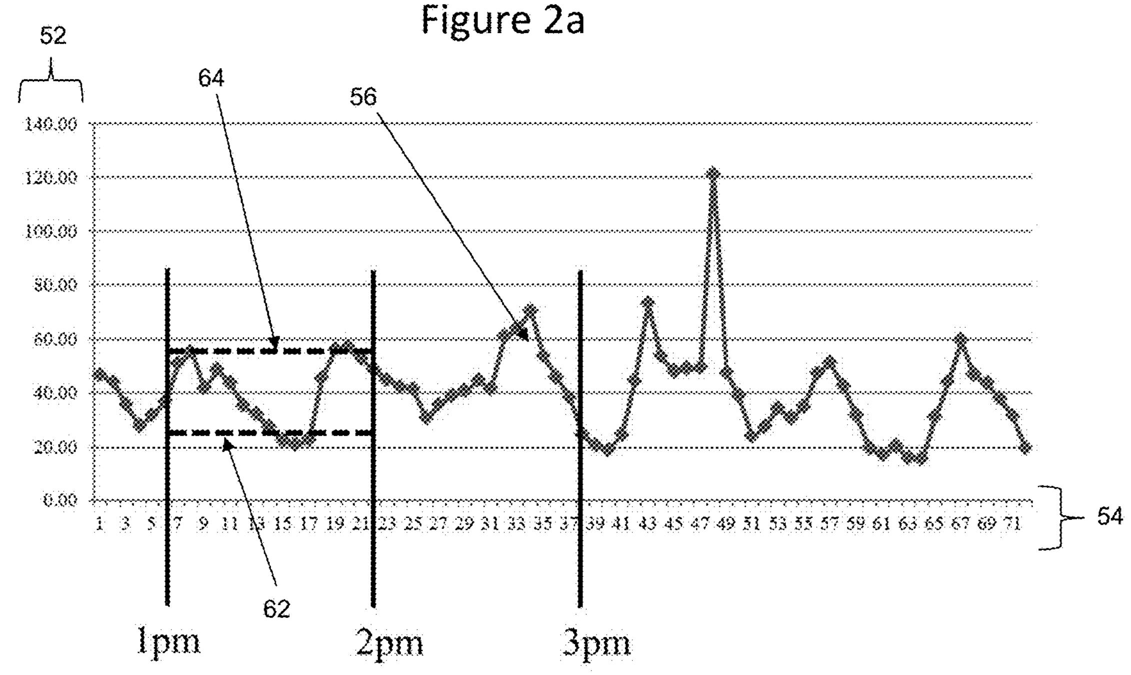
Figure 2C:
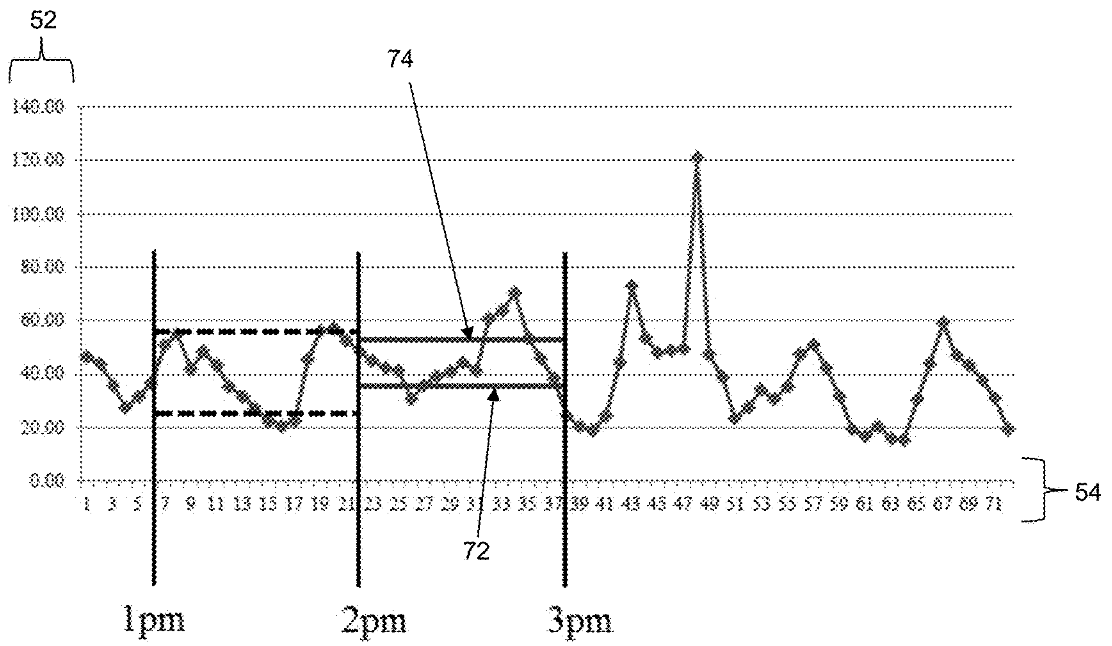

FIGS. **2*a*-2*c* are graphs generally illustrating the bidding process. FIG. 2*a* is a graph showing the price of electricity 52, plotted with respect to time (Y axis 54—price, X axis 56—time). Assuming the time is 1 pm, the price of electricity at 1 pm is known. Also known at 1 pm are the bids determined at 12 pm for use during the time period between 1 and 2 pm. FIG. 2*a* shows the lower bid 62 and the upper bid 64 that are used during the time period between 1 and 2 pm. If the price of electricity during 1 and 2 pm goes below the lower bid 62, the system will charge the storage system. If the price of electricity during 1 and 2 pm goes above the upper bid 64**, the system will discharge or sell energy from the storage system. The state of the charge in the storage system is also known at 1 pm.

Figure 3A:
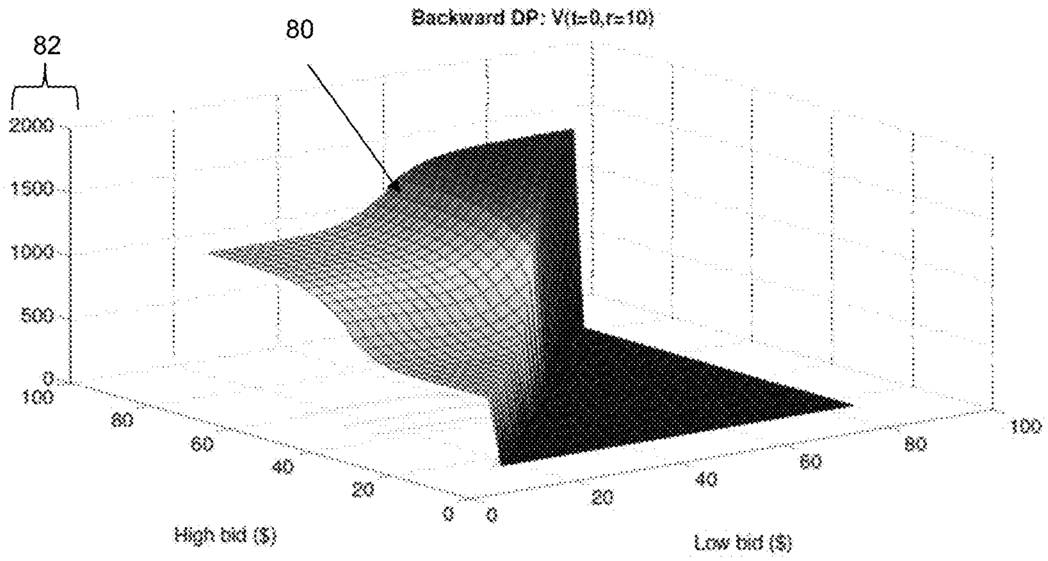
FIG. 3*a* is a graph showing an example value function using monotonicity.
Figure 3B:
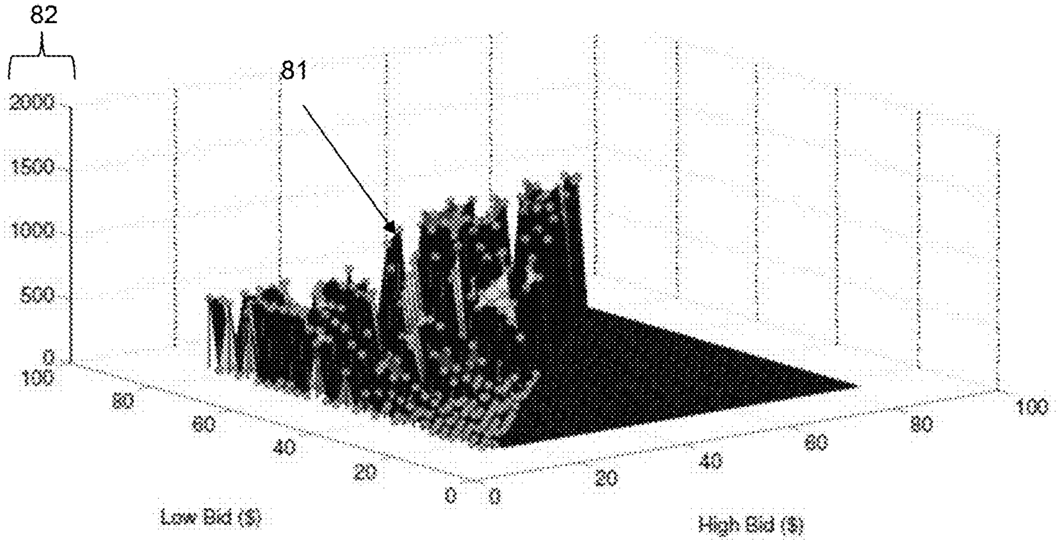
FIG. 3*b* is a graph showing an example value function without using monotonicity.

FIG. **2*c* shows the lower bid 72 and the upper bid 74 that must be determined at 1 pm and used during the time period between 2 and 3 pm. FIG. 3*a* is a graph of the value function (high and low bid plotted against value). The disclosed Monotone-ADP process leverages the principal that as the bids increase, the value 82 increases. It should be understood that the graph shown in FIG. 2*d* is simplified since it does not show the other two dimensions, namely the state of the storage system and the price of electricity (in this example it was assumed that the other two dimensions were constant). FIG. 3*b*** is a graph of the value function without using monotonicity.

Figure 4A:
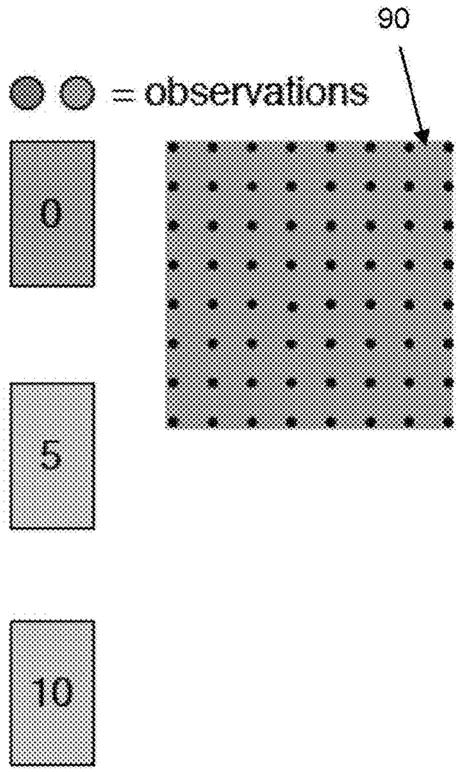
FIGS. 4*a*-4*c* are diagrams illustrating determination of the value function using monotonicity.
Figure 4B:
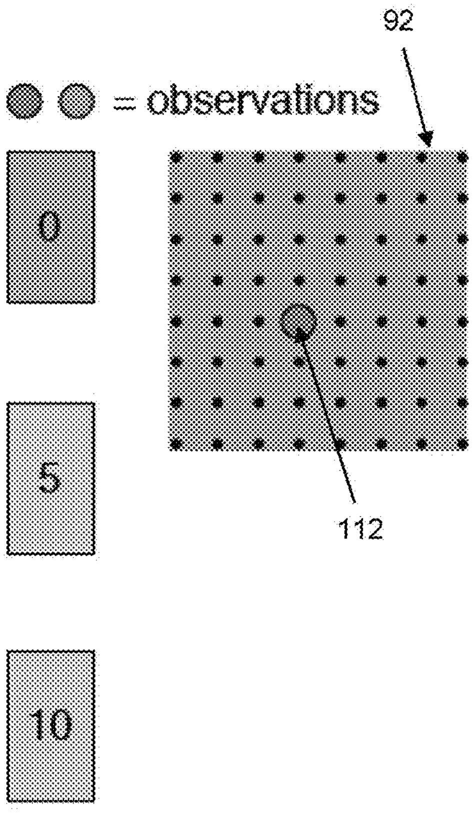
Figure 4C:
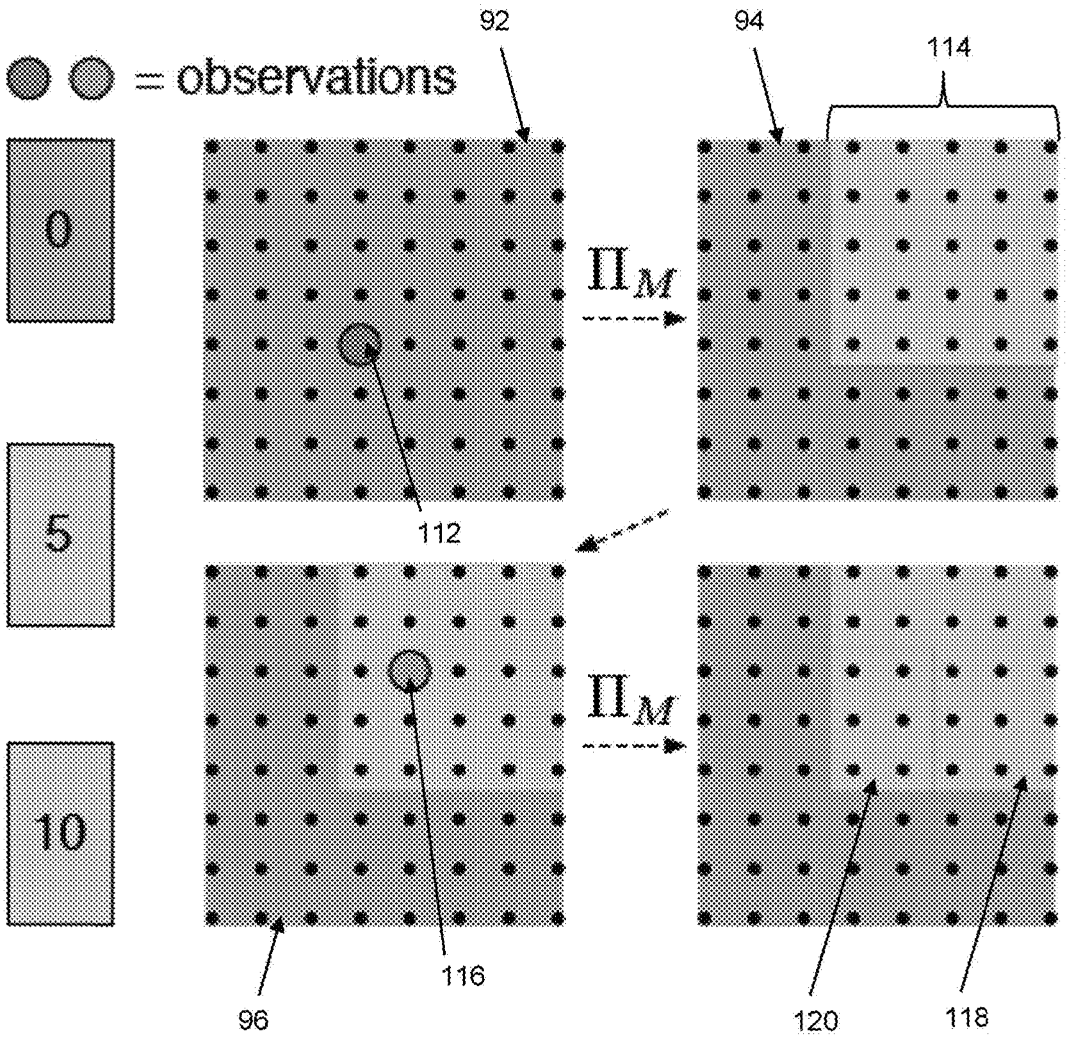

FIGS. **4*a*-4*c* are diagrams illustrating determination of the value function using monotonicity. In these examples, the two axes are low bid and high bid. FIG. 4*a* shows the initial state of the value function 90 where all values are zero. FIG. 4*b* shows the state of the value function 92 with a particular low bid and high bid combination for which a value of 10 was observed as shown by dot 112. FIG. 4*c* shows the progression as the value function is updated in an iterative process. After the low bid and high bid combination for which a value of 10 is observed (value function 92) and using an monotone update approach, the value function is updated to set all values above and to the right to the value of 10 (value function 94) as shown by area or region 114**. So with a single observation, we are able to update an entire region.

As the process continues, an updated value is observed. In this example a low bid and high bid combination for which a value of 5 is observed as shown by dot 116 (value function 96). Again using a monotone update approach, all values in area 114 to the left and down then set to 5 as shown by regions 118 and 120. Now with only two observations we are able to update a large area of this value function. This process is repeated with additional updated values for a low bid and high bid combination. As more iterations are completed, the value function becomes more and more precise. The end result is a lookup table with a value for every four dimensional combination of system parameters. However, using the above approach, large regions of the lookup table are updated with each iteration (see e.g., the value function shown in FIG. 3*a*). This approach allows for rapid processing as compared to all other known approaches for approximating a value function with four dimensions.

Figure 5:
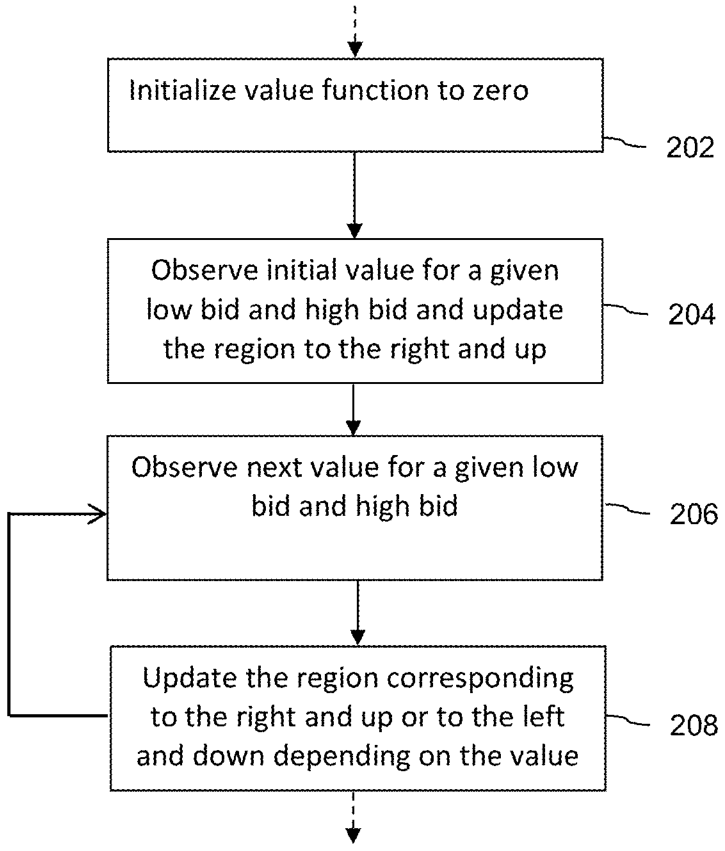
FIG. 5 is a basic flow chart showing generation of a lookup table.

FIG. 5 is a basic flow chart showing generation of a lookup table. It should be understood that any flowcharts contained herein are illustrative only and that other entry and exit points, time out functions, error checking routines and the like (not shown) would normally be implemented in typical system hardware/software. It is also understood that system hardware/software may run continuously after being launched. Accordingly, any beginning and ending points are intended to indicate logical beginning and ending points of a portion of code or hardware function that can be integrated with other hardware or portions of code and executed as needed. The order of execution of any of the blocks may also be varied without departing from the scope of this disclosure. Implementation of these aspects in hardware and/or software is readily apparent and well within the grasp of those skilled in the art based on the disclosure herein.

The value function is set to zero as shown by block 202. An initial value is observed for a given low bid and high bid. The value function is updated in the region to the right and up as shown by block 204. The next value for the low and high bid is observed as shown by block 206. The corresponding region of the value function is then updated. If the newly observed value is lower than the surrounding region, the region to the left and down is updated. If the newly observed value is higher than the surrounding region, the region to the right and up is updated. This process continues until sufficient iterations are completed to approximate the value function.

A portion of a lookup table is shown in FIG. 6. The value function initially has a numeric value of 0 for each possible combination of parameter values of the 4 dimensions (state of the storage system, price of electricity, low bid from an hour ago, high bid from an hour ago). These values are then updated as new observations are made. It should be understood that the lookup table can have a variety of dimensions. For example, if each state is discretized into n discrete buckets, the resulting table with values for all four dimensions will be $n^4$ in size. So if 50 buckets are used, the look up table will store $50^4$ or 6.25 million values. Further, the same state must be visited a number of times to compute an accurate estimate of the value of that state, which means it may take 600 million updates to produce estimates for all 6.25 million states. Using monotonicity, updating one state produces updates to many other states, resulting in a dramatic reduction in the number of iterations needed to estimate a value function with 6.25 million entries, without giving up the generality of lookup table representations.

Once the lookup table is generated, the value function can then be used to find the best high and low bids. While the lookup table is still quite large, finding the best bid by searching over these values is extremely fast. Once the lookup table is completed (estimating the value function), optimal bids can be generated very quickly (using the value function to generate bids). In general a specific numeric value is located in the lookup table based on a known set of four dimensions. Optimal bids are then generated based on the specific numeric value retrieved from the lookup table. It should be understood that a variety of techniques may be used to generate optimal bids including the approach outlined in the Section 4.4 Post-Decision Algorithm of U.S. Provisional Application No. 61/945,273.

Further description of the disclosed device is included in U.S. Provisional Application No. 61/945,273, filed Feb. 27, 2014. Any references listed in the provisional application as well as the appended materials are also part of the application and are incorporated by reference in their entirety as if fully set forth herein.

It should be understood that many variations are possible based on the disclosure herein. Although features and elements are described above in particular combinations, each feature or element can be used alone without the other features and elements or in various combinations with or without other features and elements. The methods or techniques provided herein may be implemented in a computer program, software, or firmware incorporated in a non-transitory computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). Also—the method can handle higher dimensional problems (up to six or seven dimensions) in order to handle additional generality in the representation of the problem.

What is claimed is:

1. A method for controlling a plurality of energy storage systems coupled to a power grid, the method comprising:
- providing a plurality of energy storage systems;
- providing a central processor and a plurality of storage system processors, the central processor being in communication with the plurality of storage system processors, each storage system processor being coupled to one of the plurality of energy storage systems;
  - the central processor being programmed to generate a lookup table approximating a value function having four dimensions including: state of the storage system, price of electricity, prior low bid, and prior high bid;
  - the central processor or the plurality of storage system processors being programmed to generate near-optimal charge/discharge instructions for the plurality of energy storage systems based on the generated lookup table; and
- charging/discharging the plurality of energy storage systems based on the generated charge/discharge instructions;
- wherein generation of the lookup table comprises:
  - observing an initial numeric value for a first set of dimensions and exploiting monotonicity of the value function to update a first region of the lookup table; and
  - iteratively observing subsequent numeric values for a next set of dimensions and exploiting monotonicity of the value function to update subsequent regions of the lookup table, the lookup table having numeric values for all possible sets of dimensions.

2. The method of claim 1 further comprising generating bids for a look-ahead energy market, wherein the look-ahead energy market is an hour-ahead energy market.

3. The method of claim 1 further comprising locating a specific numeric value in the lookup table based on a known set of dimensions and generating optimal bids for a look-ahead energy market based on the specific numeric value.

4. The method of claim 3 further comprising providing a second processor programmed to locate the specific numeric value in the lookup table and generate the optimal bids based on the specific numeric value.

5. The method of claim 3 wherein the optimal bids include a low bid for a future time period and a high bid for the future time period.

6. The method of claim 1 wherein the lookup table is updated on a periodic basis.

7. The method of claim 1 wherein the lookup table is updated on a daily basis.

8. A system for controlling a plurality of energy storage systems coupled to a power grid, the system comprising:

a plurality of energy storage systems;

a central processor and a plurality of storage system processors, the central processor being in communication with the plurality of storage system processors, each storage system processor being coupled to one of the plurality of energy storage systems;

the central processor being programmed to generate a lookup table approximating a value function having four dimensions including: state of the storage system, price of electricity, prior low bid, and prior high bid; and the central processor or the plurality of storage system processors being programmed to generate near-optimal charge/discharge instructions for the plurality of energy storage systems based on the generated lookup table;

the plurality of energy storage systems being charged/discharged based on the generated charge/discharge instructions;

wherein generation of the lookup table comprises:

observing an initial numeric value for a first set of dimensions and exploiting monotonicity of the value function to update a first region of the lookup table; and iteratively observing subsequent numeric values for a next set of dimensions and exploiting monotonicity of the value function to update subsequent regions of the lookup table, the lookup table having numeric values for all possible sets of dimensions.

9. The system of claim 8 wherein the central processor is programmed to locate a specific numeric value in the lookup table based on a known set of dimensions and generate optimal bids for a look-ahead energy market based on the specific numeric value.

10. The system of claim 9 wherein a second processor is programmed to locate the specific numeric value in the lookup table based on a known set of dimensions and generate the optimal bids based on the specific numeric value.

11. The system of claim 9 wherein the optimal bids include a low bid for a future time period and a high bid for the future time period.

12. The system of claim 8 wherein the lookup table is updated on a periodic basis.

13. The system of claim 8 wherein the lookup table is updated on a daily basis.

14. A non-transitory computer-readable medium having stored thereon a computer program for execution by a central processor and plurality of storage system processors configured to perform a method for controlling a plurality of energy storage systems coupled to a power grid, the method comprising:

providing a plurality of energy storage systems;

providing the central processor and plurality of storage system processors, the central processor being in communication with the plurality of storage system processors, each storage system processor being coupled to one of the plurality of energy storage systems;

the central processor being programmed to generate a lookup table approximating a value function having four dimensions including: state of the storage system, price of electricity, prior low bid and prior high bid; and the central processor or the plurality of storage system processors being programmed to generate near-optimal charge/discharge instructions for the plurality of energy storage systems based on the generated lookup table;

charging/discharging the plurality of energy storage systems based on the generated charge/discharge instructions;

wherein generation of the lookup table comprises:

observing an initial numeric value for a first set of dimensions and exploiting monotonicity of the value function to update a first region of the lookup table; and iteratively observing subsequent numeric values for a next set of dimensions and exploiting monotonicity of the value function to update subsequent regions of the lookup table, the lookup table having numeric values for all possible sets of dimensions.

15. The computer-readable medium of 14 further comprising locating a specific numeric value in the lookup table based on a known set of dimensions and generating optimal bids for a look-ahead energy market based on the specific numeric value.

16. The computer-readable medium of 15 wherein the optimal bids include a low bid for a future time period and a high bid for the future time period.

17. The computer-readable medium of 14 wherein the lookup table is updated on a periodic basis.

18. The computer-readable medium of 14 wherein the lookup table is updated on a daily basis.

19. The system of claim 9 wherein the look-ahead energy market is an hour-ahead energy market.

20. The computer-readable medium of claim 15 wherein the look-ahead energy market is an hour-ahead energy market.

* * * * *